United States Patent [19]
Grubish

[11] Patent Number: 6,083,108
[45] Date of Patent: Jul. 4, 2000

[54] COLLAPSIBLE AND RELATIVELY ROTATABLE DRIVE SHAFT

[75] Inventor: David John Grubish, Maplewood, Minn.

[73] Assignee: General Electric Co., Schenectady, N.Y.

[21] Appl. No.: 09/074,212

[22] Filed: May 7, 1998

[51] Int. Cl.[7] .................................................. F16C 3/03
[52] U.S. Cl. ..................... 464/162; 464/113; 464/182; 403/377; 403/109.1
[58] Field of Search .................... 403/377, 109.8, 403/109.1, 110; 464/182, 162, 113, 183, 179, 901

[56] References Cited

U.S. PATENT DOCUMENTS

| | | |
|---|---|---|
| 3,754,411 | 8/1973 | Orain .......................................... 464/79 |
| 3,782,841 | 1/1974 | Winckelhaus ............................ 464/182 |
| 4,236,388 | 12/1980 | Geisthoff ................................... 464/169 |
| 4,308,729 | 1/1982 | Codon ........................................ 464/16 |
| 4,641,591 | 2/1987 | Draghicchio ............................ 464/162 |
| 4,712,663 | 12/1987 | Teraoka .................................. 192/58 A |
| 5,707,167 | 1/1998 | Battocchio ............................ 403/109.1 |
| 5,888,014 | 3/1999 | Lung et al. ........................... 403/109.1 |
| 5,902,186 | 5/1999 | Gaukel ..................................... 464/162 |

FOREIGN PATENT DOCUMENTS

| | | |
|---|---|---|
| 0 047 107 | 3/1982 | European Pat. Off. . |
| 195717 | 5/1938 | Switzerland ........................... 464/162 |
| 465143 | 5/1937 | United Kingdom . |
| 978027 | 12/1964 | United Kingdom . |
| 1 244 742 | 9/1971 | United Kingdom . |
| 2 006 393 | 5/1979 | United Kingdom . |
| 2 037 401 | 7/1980 | United Kingdom . |
| 1 591 527 | 6/1981 | United Kingdom . |
| 2105820 | 3/1983 | United Kingdom ................... 464/182 |
| WO 87/05369 | 9/1987 | WIPO . |

*Primary Examiner*—Terry Lee Melius
*Assistant Examiner*—Kenneth Thompson
*Attorney, Agent, or Firm*—Nixon & Vanderhye

[57] ABSTRACT

A drive shaft assembly for a portable lathe includes a first hollow shaft and a second shaft axially aligned with and telescopingly received in the first shaft, for permitting an effective length of the drive shaft to be altered within a limited range. The first and second shafts are also rotatable relative to each other. Opposite ends of the first and second shafts have uncovered joints including mounting flanges attached thereto, and a locking device is provided to lock both first and second shafts relative to each other after they have been adjusted to a desired axial and rotational orientation.

9 Claims, 1 Drawing Sheet

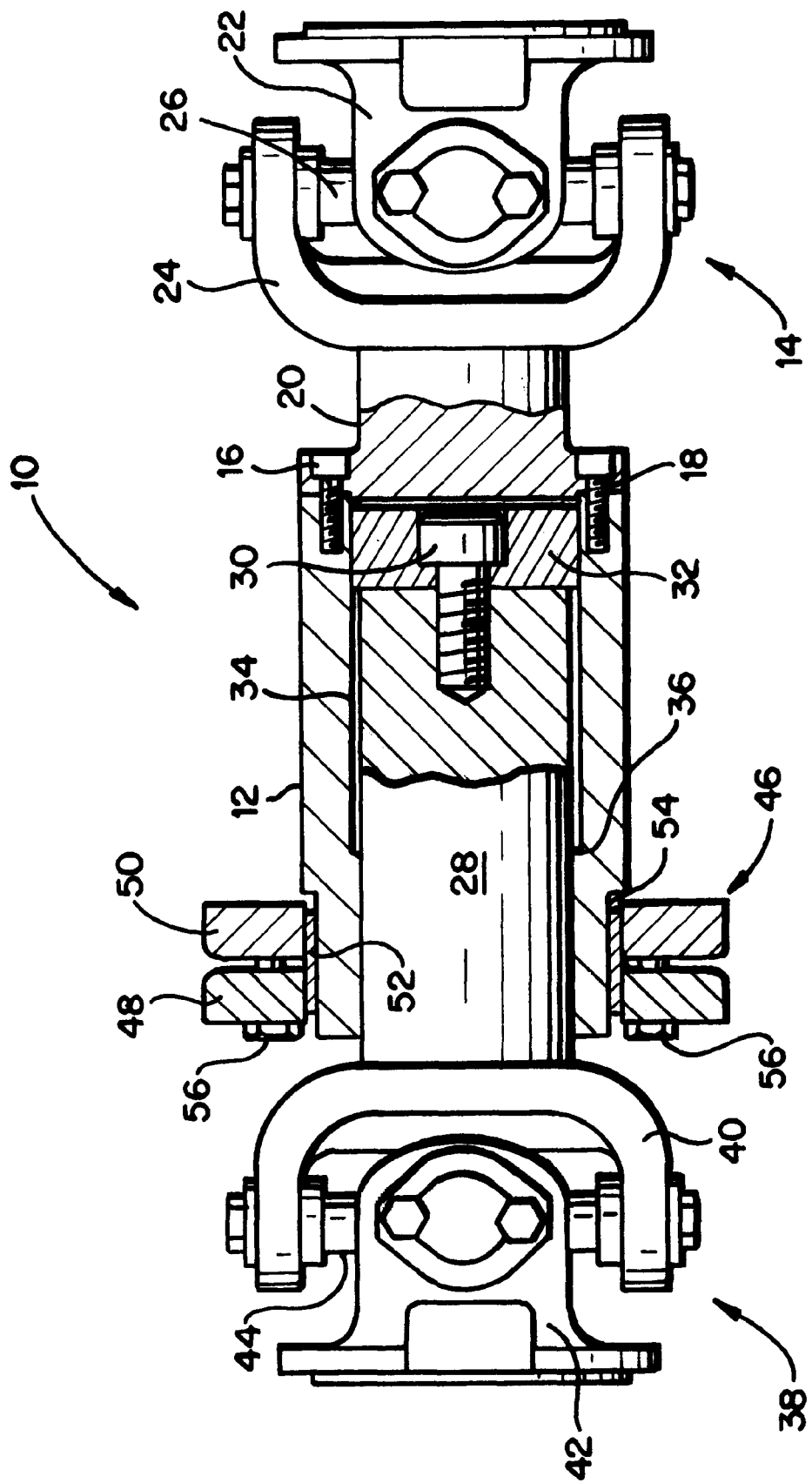

COLLAPSIBLE AND RELATIVELY ROTATABLE DRIVE SHAFT

TECHNICAL FIELD

This invention relates generally to machine tools and specifically, to an adjustable drive shaft for a portable lathe.

BACKGROUND AND SUMMARY OF THE INVENTION

Large portable lathes generally include a drive assembly (normally called a headstock) to rotate a workpiece along with two bearing pedestals which support the workpiece while it is being turned. There is a large drive shaft which transmits the power from the headstock to the workpiece, and it is used to take up any misalignment between the center of rotation of the headstock and the workpiece. However, it is a difficult task to attach the drive shaft between the headstock and the workpiece because the workpiece is usually large and heavy. Consequently, a crane is typically required to move the workpiece axially while at the same time, the headstock drive shaft is rotated until all of the bolt holes on the drive shaft and workpiece can be lined up and tightened.

The present invention provides a drive shaft that can be extended or retracted, with opposite ends able to swivel with respect to each other, thereby facilitating set-up of the lathe and workpiece.

In accordance with an exemplary embodiment of the invention, the drive shaft is comprised of two separate shaft pieces, each containing a standard universal joint at opposite ends thereof. One shaft piece slides into the other in telescoping fashion, which allows for the axial adjustment of the drive shaft. At the same time, one shaft piece is rotatable relative to the other, thereby also providing great flexibility, especially considering the use of universal joints at the end of each shaft. Once positioned where desired, the shaft pieces are locked in place relative to each other via a conventional circumferential friction locking device which allows it to transfer the torque and horsepower of the input drive mechanism.

Accordingly, in its broader aspects, the present invention relates to a drive shaft assembly for a portable lathe connectable between a workpiece and a lathe headstock, the drive shaft assembly comprising a first hollow shaft; a second shaft axially aligned with and telescopingly received in the first shaft, for permitting an effective axial length of the drive shaft assembly to be altered within a limited range; the first and second shafts also being rotatable relative to each other; opposite ends of the first and second shafts having mounting flanges attached thereto; and a locking device effective to lock both first and second shafts relative to each other.

Other objects and advantages of the subject invention will become apparent from the detailed description which follows.

BRIEF DESCRIPTION OF THE DRAWINGS

The single FIGURE is a side elevation, partly in section, illustrating a drive shaft in accordance with an exemplary embodiment of the invention.

BEST MODE FOR CARRYING OUT THE INVENTION

The drive shaft assembly 10 in accordance with this invention includes a first hollow shaft 12 having a first U-joint 14 secured thereto by fasteners 16 extending through a radial flange 18 at the rearward end 20 of the U-joint (which closes one end of the shaft 12). The latter includes a flange yoke 22 pivotally mounted to a cradle 24 via pin or axle 26. It will be appreciated that the U-joint 14 as described is of conventional construction. The hollow shaft 12 slidably receives at its opposite open end, a second solid shaft 28. The interior end of the shaft 28 has fixed thereto by means of hex screw 30, a shaft retainer 32 having a diameter marginally larger than the shaft 28. The interior surface of shaft 12 is counterbored at 34 to a radial shoulder 36. With this arrangement, shaft 28 can slide in and out of the shaft 12 between a retracted position illustrated in the Figure, to an extended position where the retainer 32 engages the shoulder 36.

In addition, the shaft 28 is rotatable within the shaft 12 and thus relative to the U-joint 14. Shaft 28 also mounts a U-joint 38, with the cradle 40 fixed to the shaft 28, and a flange yoke 42 pivotally secured thereto via axle 44. Thus, the U-joint cradle 40 is adjustable both axially and rotationally relative to the other U-joint cradle 24.

It will be appreciated that the U-joint 14 is adapted to be secured to the lathe headstock, while U-joint 30 is adapted to be secured to the workpiece.

In order to lock the shaft 28 relative to the shaft 12, a conventional shrink disc locking assembly or clamp 46 is employed. More specifically, a pair of discs 48, 50 are located about a shrink sleeve 52 surrounding a slightly reduced diameter portion 54 of the hollow shaft 12. Screws 56 located about one of the discs 48 are tightened in a prescribed manner to cause a compression lock between the shaft 12 and the shaft 28, once the flange yokes 24 and 34 are properly oriented both axially and rotationally. Suitable shrink discs are available from B-Loc Corp. Other suitable locking mechanisms may be employed as well. It should also be pointed out that attachment flanges other than the specifically illustrated and described U-joints may also be used.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a portable lathe, a drive shaft assembly connectable between a workpiece and a lathe headstock, the drive shaft assembly comprising a first hollow shaft; a second shaft axially aligned with and telescopingly received in said first shaft, for permitting an effective axial length of said drive shaft assembly to be altered within a limited range; said first and second shafts also being rotatable relative to each other; opposite ends of said first and second shafts having mounting flanges attached thereto; and a locking device effective to lock said first shaft to said second shaft after said first and second shafts are axially and rotationally oriented relative to each other.

2. A drive shaft assembly for a portable lathe connectable between a workpiece and a lathe headstock, the drive shaft assembly comprising a first hollow shaft; a second shaft axially aligned with and telescopingly received in said first shaft, for permitting an effective axial length of said drive shaft assembly to be altered within a limited range; said first and second shafts also being rotatable relative to each other; opposite ends of said first and second shafts having mounting flanges attached thereto; and a locking device effective to lock said first shaft to said second shaft after said first and second shafts are axially and rotationally oriented relative to each other, and wherein said locking device is a compression clamp.

3. The drive shaft assembly of claim 1 wherein one of said mounting flanges comprises a U-joint including a substantially U-shaped cradle and a flange yoke pivotally mounted within said cradle.

4. The drive shaft assembly of claim 1 wherein both of said mounting flanges comprise U-joints, each U-joint including a substantially U-shaped cradle and a flange yoke pivotally mounted within said cradle.

5. The drive shaft assembly of claim 1 wherein said second shaft has a radially enlarged retaining cap fixed to one end thereof which is located within the first shaft; and wherein the first shaft has an interior bore which is enlarged over an axial portion thereof to thereby allow said second shaft and said retaining cap to slide axially therein between axially extended and retracted positions.

6. The drive shaft assembly of claim 4 wherein one of said U-joints includes a shaft portion with a radial flange at an end thereof remote from said flange yoke, said radial flange secured to one end of said first hollow shaft.

7. The drive shaft assembly according to claim 6 wherein the other of said U-joints is integrally formed with said second shaft.

8. The drive shaft assembly of claim 7 wherein said second shaft has a radially enlarged retaining cap fixed to that end which is located within the first shaft; and wherein the first shaft has an interior bore which is enlarged over an axial portion thereof to thereby allow said second shaft and said retaining cap to slide axially therein between axially extended and retracted positions.

9. The drive shaft assembly of claim 8 wherein said second shaft has a radially enlarged retaining cap fixed to that end which is located within the first shaft; and wherein the first shaft has an interior bore which is enlarged over an axial portion thereof to thereby allow said second shaft and said retaining cap to slide axially therein between axially extended and retracted positions.

\* \* \* \* \*